O. F. MÖLLER.
WINDSHIELD SUPPORTING BRACKET.
APPLICATION FILED APR. 24, 1920.
1,416,114.
Patented May 16, 1922.
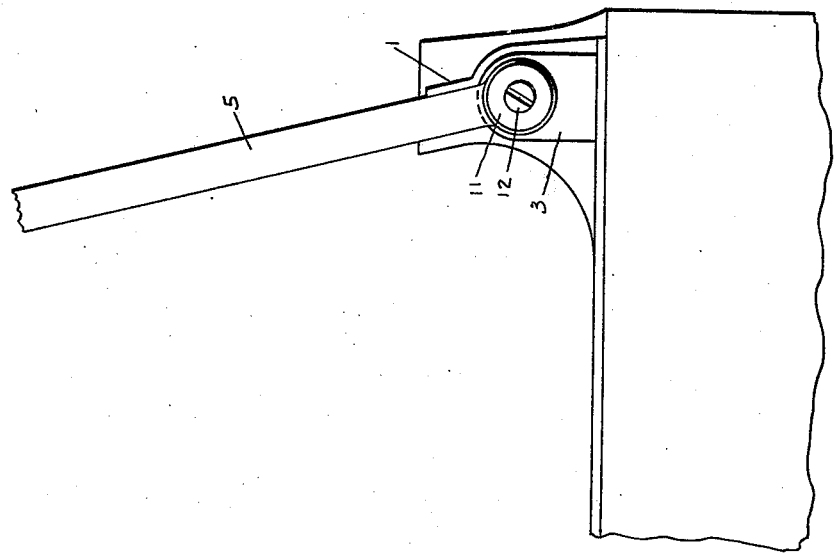
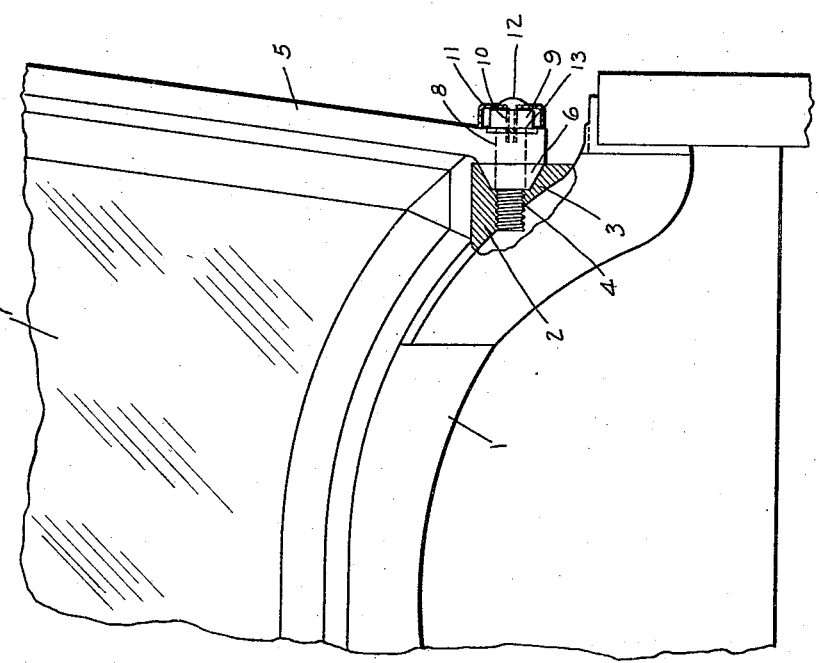
INVENTOR.
Otto F. Möller.
BY
Bradford Morrill & Bierman
ATTORNEYS.

UNITED STATES PATENT OFFICE.

OTTO F. MÖLLER, OF INDIANAPOLIS, INDIANA, ASSIGNOR TO NATIONAL MOTOR CAR & VEHICLE CORPORATION, OF INDIANAPOLIS, INDIANA, A CORPORATION OF NEW YORK.

WINDSHIELD-SUPPORTING BRACKET.

1,416,114.  Specification of Letters Patent.  Patented May 16, 1922.

Application filed April 24, 1920. Serial No. 376,352.

*To all whom it may concern:*

Be it known that I, OTTO F. MÖLLER, a citizen of the United States, residing at Indianapolis, in the county of Marion and State of Indiana, have invented certain new and useful Improvements in Windshield-Supporting Brackets, of which the following is a specification.

This invention relates to supporting means, especially adapted to support the wind shields of motor cars, it being among the objects of this invention to produce a support which is simple in construction, and which securely fastens the wind shield to the body of the car with a minimum amount of strain on the cowl of the body.

In carrying the objects of my invention into effect, I provide a bracket, or other suitable member, which is secured to the cowl of the body and has a cone-shaped socket into which the wind shield support is inserted. Means are provided for firmly holding the support in position.

Referring to the accompanying drawings forming a part hereof and in which similar reference characters denote similar parts, Figure 1 represents a partial view of a wind shield secured to a motor car body by means of my device, some parts being shown in section, and Figure 2 a side view of the same.

To the cowl of the body 1 of the motor car is secured a bracket 2 in any suitable manner. An inwardly extending cone-shaped socket is formed on the outer side of the bracket 2, the inner portion of which is tapped and threaded as shown at 4. The wind shield support 5 has a cone-shaped projection 6 adapted to fit into cone-shaped socket 3 and holds the wind shield 7 in position. A cap screw 8 fits into an opening in cone shaped member 6 and is screwed into threaded portion 4 of bracket 2.

The head 9 of screw 8 is tapped at 10 and a cover member 11 fits thereover. An ordinary machine screw 12 is screwed into tapped portion 10 to hold cover member 11 in position, and a washer 13 is inserted into a depression in the support 5.

Although the screw 8 is ordinarily tightly locked in place so as to prevent any movement of support 5, the friction may be adjusted so as to allow of sufficient movement to take up the strains produced in driving over rough roads.

Having thus fully described my said invention, what I claim as new and desire to secure by Letters Patent, is:

A supporting means comprising a bracket having a conical socket formed therein the inner end of which terminates in a threaded portion, a support, an integral cone shaped projection at the lower end of said support, said support and projection having an opening and a depression at the outer end of said opening, a washer fitting in said depression, a screw passing through said opening and washer and engaging the threaded portion of said socket, the head of said screw projecting beyond the outer face of said support, and having a threaded opening, a cup shaped cover fitting over the projecting head of said screw and having its flange edge resting against the face of said support, and a second screw passing centrally through said cover and into the threaded opening in said screw for securing the cover member in position.

In witness whereof, I have hereunto set my hand and seal at Indianapolis, Indiana, this 17th day of April, A. D. nineteen hundred and twenty.

OTTO F. MÖLLER. [L. S.]

Witnesses:
H. C. BIERMAN,
HELEN J. BARTH.